United States Patent [19]

Graft et al.

[11] Patent Number: 5,624,345
[45] Date of Patent: Apr. 29, 1997

[54] APPARATUS FOR PRELOADING AXLE DIFFERENTIAL BEARINGS AND METHOD OF ASSEMBLING A DIFFERENTIAL

[75] Inventors: John T. Graft, Fort Wayne; Richard E. Cleveland, Garrett, both of Ind.

[73] Assignee: Dana Corporation, Toledo, Ohio

[21] Appl. No.: 243,460

[22] Filed: May 16, 1994

[51] Int. Cl.$^6$ .................... F16H 48/06; F16C 23/10
[52] U.S. Cl. .................. 475/230; 475/246; 384/563
[58] Field of Search .................. 475/230, 246, 475/245, 253, 346, 347; 384/563

[56] References Cited

U.S. PATENT DOCUMENTS

| | | | |
|---|---|---|---|
| 2,736,617 | 2/1956 | Lippman | 308/20 |
| 2,836,473 | 5/1958 | Tydeman | 308/207 |
| 2,894,790 | 7/1959 | Rudnicki et al. | 308/207 |
| 3,202,466 | 8/1965 | Kaptur | 384/563 X |
| 3,260,132 | 7/1966 | West et al. | 475/246 X |
| 3,312,511 | 4/1967 | Synek | 384/563 |
| 3,726,576 | 4/1973 | Bambrook et al. | 308/207 |
| 3,900,232 | 8/1975 | Rode | 308/1 R |
| 3,934,957 | 1/1976 | Derner | 308/207 A |
| 4,033,644 | 7/1977 | Reneerkens | 384/563 |
| 4,597,311 | 7/1986 | Takeda | 475/230 X |
| 4,611,935 | 9/1986 | Rode | 384/548 |
| 5,048,979 | 9/1991 | Coates | 384/563 X |
| 5,061,089 | 10/1991 | Bair et al. | 384/563 X |
| 5,269,731 | 12/1993 | Scudder et al. | 475/230 |

FOREIGN PATENT DOCUMENTS

| | | | |
|---|---|---|---|
| 211053 | 12/1983 | Japan | 475/230 |

*Primary Examiner*—Khoi Q. Ta
*Attorney, Agent, or Firm*—Oldham & Oldham Co., LPA

[57] ABSTRACT

The invention is directed to an axle differential bearing preloading apparatus and method of assembling an axle differential. The apparatus provides a substantially uniform differential bearing preload regardless of wear of the drive gears or bearing assemblies. The assembly of the differential case into the differential carrier is simplified, and subsequent adjustment of bearing preload is not necessary over the useful life of the axle. The vehicle axle differential includes a differential case mounted by axially spaced bearing assemblies. The bearing assemblies are mounted within bearing seats formed in the carrier housing, with one of the bearing seats also housing a load deflection member acting on the bearing assembly. The load deflection member maintains a substantially constant predetermined bearing preload upon wear of the drive gears or bearing assemblies. The method of assembling the differential allows backlash and bearing preload to be set easily, while avoiding the requirement to spread the carrier housing in some cases.

8 Claims, 3 Drawing Sheets

APPARATUS FOR PRELOADING AXLE DIFFERENTIAL BEARINGS AND METHOD OF ASSEMBLING A DIFFERENTIAL

BACKGROUND OF THE INVENTION

The invention relates in general to automotive differentials including a differential carrier rotatably supporting a differential case by bearing assemblies mounted in the carrier. Precise centering of the differential case assembly within the carrier is provided by the bearing assemblies, and the bearing assemblies are preloaded to position the differential case assembly and provide the desired amount of backlash between a drive pinion and ring gear.

Differentials for automotive or similar uses are well-known in the prior art, and generally comprise a differential case rotatably mounted in a carrier by axially spaced bearing assemblies. Mounting of the bearings to provide the desired amount of backlash between a drive pinion and the ring gear of the drive gear assembly or to eliminate end play of the rotor have presented problems, particularly as the bearing assemblies or gears wear. Proper engagement of the ring gear carried by the differential case with the input drive pinion is necessary, and subsequent wear of the gears or bearings will result in misadjustment of backlash and possibly end play in the rotor. This in turn normally requires adjustment of the bearings. Generally, prior art differential case bearings have been made adjustable by use of adjustment shims or the like, with it many times being necessary to remove the differential case assembly to affect adjustment of backlash or bearing preload. Such labor intensive procedures add cost and complexity to the adjustment procedure. It would be preferable to eliminate the required adjustment of bearing preload to maintain proper engagement of the drive gears and accurately center the differential case within the carrier.

SUMMARY OF THE INVENTION

Based upon the foregoing, it is a main object of the invention to provide an apparatus for setting and adjusting preload of axle differential bearings to provide a substantially uniform differential bearing preload regardless of wear of the drive gears or bearing assemblies. Assembly of the differential into the axle housing is simplified, and subsequent adjustment of the bearing preload is substantially eliminated over the useful life of the axle.

The invention is directed to a vehicle axle differential comprising a differential housing having a differential case rotatably mounted within the housing. The differential housing supports axially spaced differential case anti-friction bearing assemblies which rotatably support and center the differential case within the housing. The bearing assemblies are mounted within differential bearing seats formed in the housing and one of the bearing seats houses a load deflection member to apply a predetermined preload on said bearing assembly. The load deflection member maintains a substantially constant predetermined bearing preload throughout the wear of the drive gears and the bearing assemblies. A method of assembling a differential is also set forth, allowing a predetermined bearing preload to be set easily, while avoiding the requirement to spread the carrier housing for assembly of the differential case therein. The method simplifies assembly and eliminates the need for spreader holes in the housing.

BRIEF DESCRIPTION OF THE DRAWINGS

The above and further objects and advantage of the invention will become apparent upon a further reading of the detailed description of the preferred embodiment of the invention, taken in conjunction with the drawings, wherein.

DETAILED DESCRIPTION OF THE INVENTION

Figure 1:
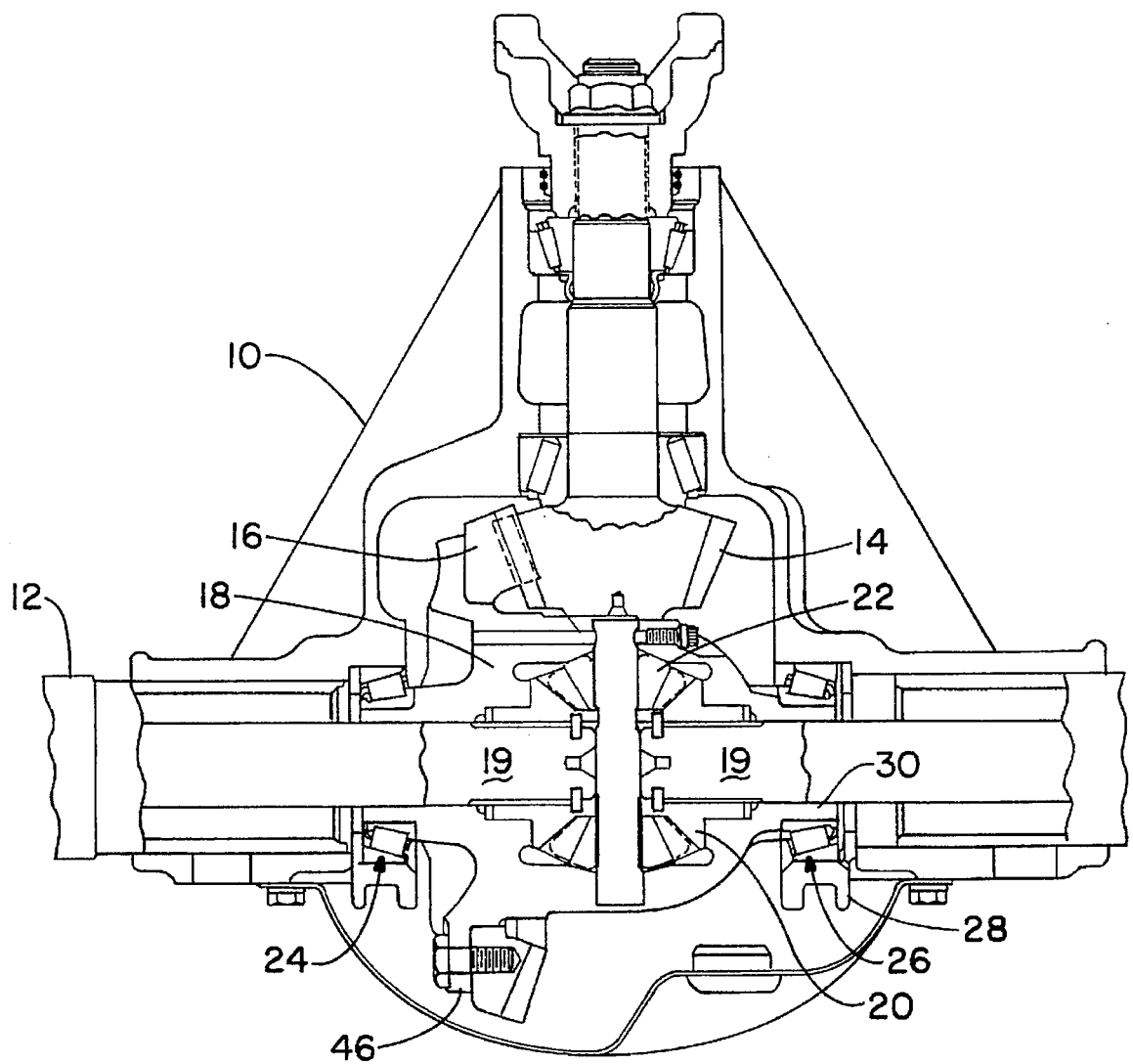
FIG. 1 is a partial cross-sectional view of a vehicle differential of the invention.

Referring now to the drawings, a vehicle differential is shown in FIG. 1, and includes a differential housing 10 carried on the underside of a vehicle. The differential may include axle tubes 12 or could be part of an independent suspension axle which would not require axle tubes 12. The differential further includes a power input pinion gear 14 secured to a drive shaft (not shown). The pinion gear 14 meshes with a ring gear 16, which in turn is secured to a ring gear flange 46 associated with the differential rotor or case 18. The differential case 18 along with ring gear 16 are rotated in the stationary carrier 10 by means of pinion gear 14. The rotary motion of the differential case 18 is imparted to the drive axles 19 and wheels (not shown) of the vehicle. Each of the drive axles is coupled to an output beveled gear set 20 permitting each to be driven at different speeds. A plurality of planetary gears 22 mesh with the opposed output gears 20 to transfer motive power, and efficient operation of the differential will depend upon precise centering of the case 18 in carrier 10. Proper centering of the case 18 within the carrier 10 provides proper meshing engagement of the ring gear 16 with the pinion gear 14. The differential case 18 is rotatably supported in the carrier 10 by means of anti-friction bearing assemblies indicated generally at 24 and 26. The bearing assemblies 24 and 26 may be tapered roller bearings which are preassembled units including associated bearing caps 28. The bearing caps 28 are secured to bearing seat 30 formed in carrier 10.

Figure 2:
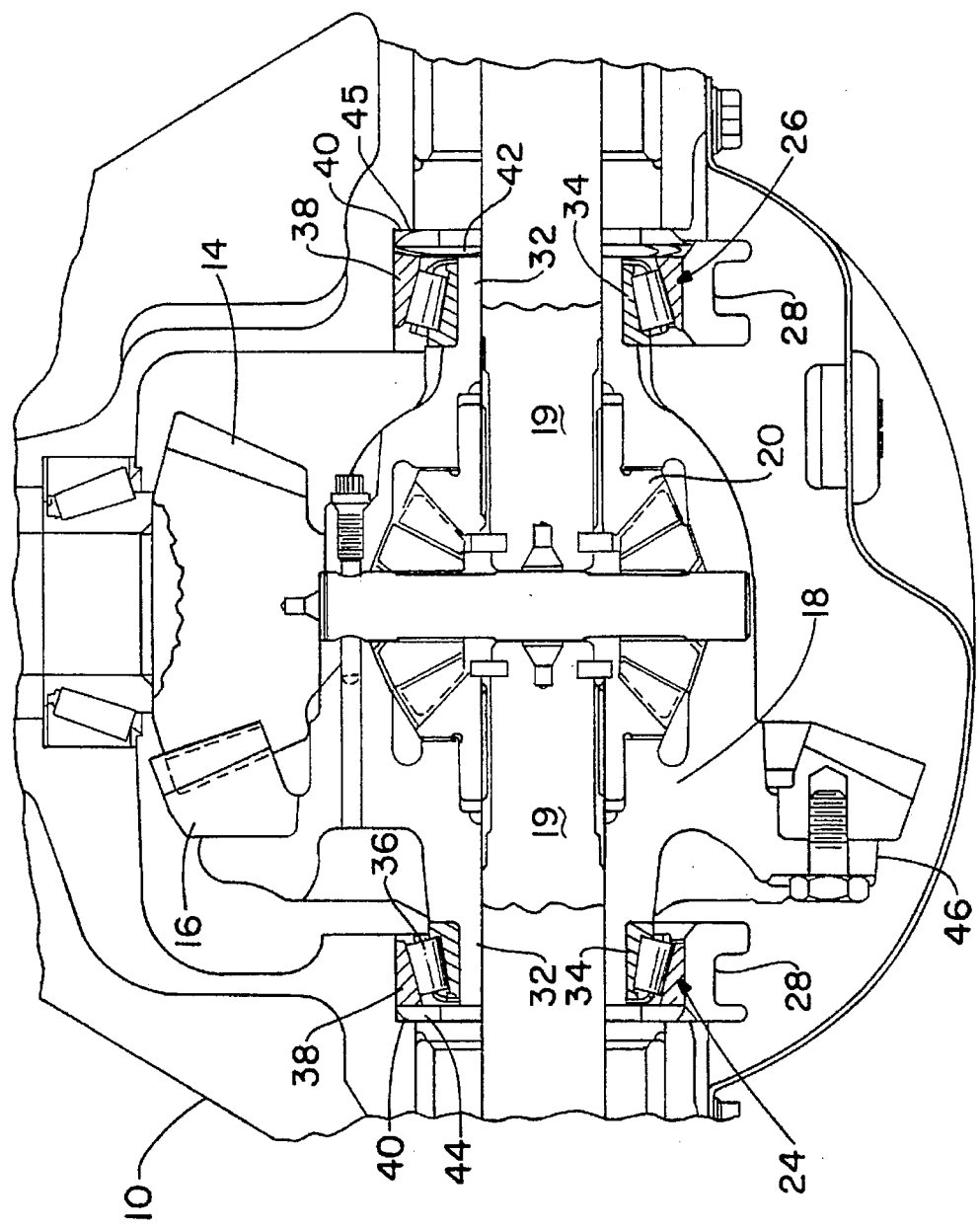
FIG. 2 is an enlarged partial cross-sectional view of the axially spaced bearing assemblies of the differential in accordance with the invention.

Turning to FIG. 2, the bearing assemblies 24 and 26 are shown in more detail. The differential case 18 terminates at each lateral end with a cylindrical hub 32. The hub 32 provides a seat for an inner bearing race 34 associated with a pre-assembled anti-friction bearing assembly 24 or 26. An outer bearing race 38 is seated within a differential bearing seat 40 machined within the carrier housing 10. In the preferred embodiment, the differential bearing seat 40 is machined to have an extended length allowing positioning of the outer bearing race 38 therein, and also providing additional space between outer bearing race 38 and seat 40. Within this space is positioned either a spacer means and/or a load deflection means as will be hereinafter described.

For preloading of the bearing assemblies, adjustment shims conventionally used in association with the bearing races have been eliminated on one side, and the space provided at the differential bearing seat 40 houses at least a load deflection means 42 on one axial side of the differential case associated with bearing assembly 26, with a spacer means 44 provided on the other side of the differential case in association with the bearing assembly 24. A spacer 45 may also be provided in association with load deflection means 42. In a preferred embodiment, and to facilitate assembling the differential case 18 into the axle housing, the differential bearing seat opposite the differential ring gear flange 46 is machined to provide space for the load deflection member 42 in association with the bearing assembly 26. The bearing assembly 24 on the ring gear side of the differential is positioned by the spacer means 44 in predetermined relationship to provide desired hypoid gear backlash. This arrangement simplifies assembly of the differential into the axle housing, which will later be described in more detail. In the preferred embodiment, the load deflection member 42 may be a wave spring, coil spring member, or Belleville washer having a predetermined spring constant to yield a substantially constant differential bearing preload relative to both bearing assemblies 24 and 26. The spacer means 44 associated with differential bearing assembly 24 on the ring gear side of the differential may be a selected thickness spacer, a threaded adjuster, shim, or a similar device positioning the outer bearing race 38 of bearing assembly 24. The spacer 45, if used, may be similar to means 44. The spacer means 44 is selected to set the hypoid backlash of the differential, while the load deflection means 42 substantially maintains a constant bearing preload, even upon wearing of the gear components or bearing assemblies. The force exerted by the load deflection means 42 tends to be constant, and will result in a quieter axle over an extended period of time corresponding to the useful life of the axle.

Figure 3:
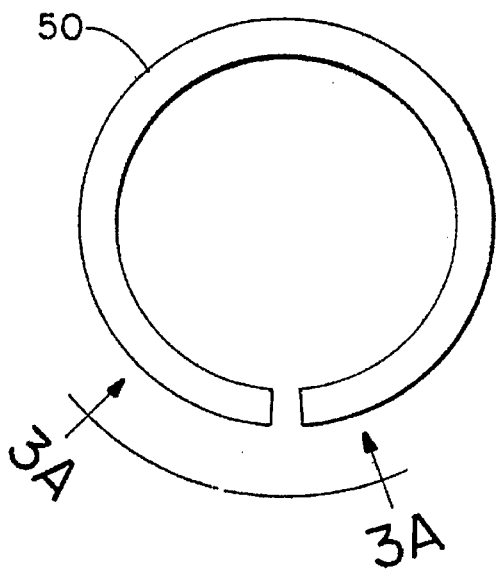
FIG. 3 shows a plan view of a load deflection member used in association with the bearing assembly as shown in FIG. 2.
Figure 3A:
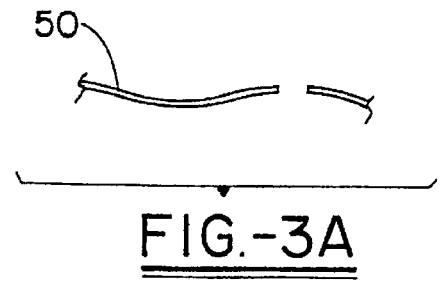
FIG. 3A shows a partial cross-section of the load deflection member along line A—A of FIG. 3.
Figure 4A:
FIGS. 4A–4B show views of alternate embodiments of a load deflection member used in association with the bearing assembly as shown in FIG. 2.
Figure 4B:
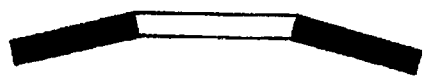

The load deflection member 42 in a preferred embodiment as shown in FIGS. 3 and 3A may be a wave spring 50 of annular shape, which is disposed around the axle shaft 19 opposite the differential ring gear flange. One or more of such wave springs 50 may be used to provide the desired spring force for a particular axle and differential configuration. Alternative embodiments of the load deflection member 42 are shown in FIGS. 4A–4B, as a coil spring or Belleville washer. In general, it has been found that the spring force necessary to provide the desired bearing preload will depend upon manufacturing tolerances of a particular axle, the hypoid gear summary and the geometry of the differential bearings. In a preferred example, for hypoid ring gears in the range of 5.0" to 11.0" in diameter, a spring force in the range of 95–165 pounds of spring force per inch of ring gear diameter is required. A spring force of 130 pounds per inch of ring gear diameter has been found to provide desired bearing preload characteristics in association with the differential bearing assemblies. The load deflection means is provided on one axial side of the differential, applying at a constant force to one of the bearing assemblies, with the other bearing assembly rigidly mounted relatively to the spacer means 44. The force applied to the bearing assembly will in conjunction with the spacer means 44 set the backlash between the hypoid gears and maintains the constant preload to also maintain the desired backlash. Assembly of the differential into the axle housing is also simplified by this arrangement.

Figure 5:
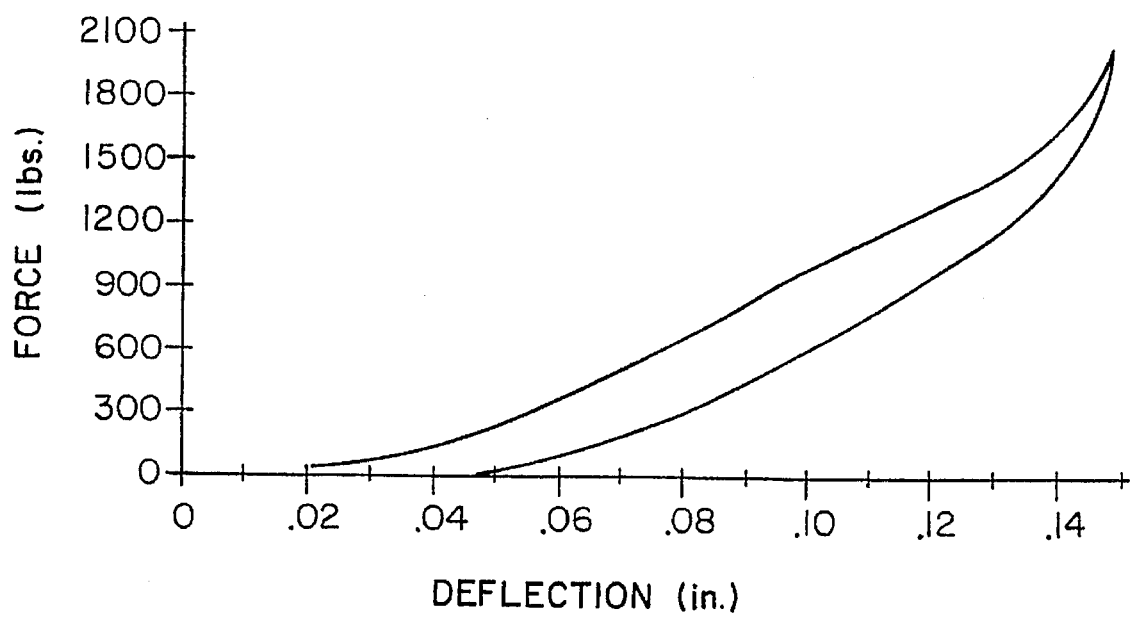
FIG. 5 shows a plot of load versus deflection for load deflection member in accordance with the invention.

Turning to FIG. 5, there is shown a plot of the load versus deflection for a load deflection means in accordance with the invention. In the example of the load deflection means as shown by the plot of FIG. 5, a pair of nested wave springs rated at 500 pounds each were compression tested. As shown by the plot, spring force provided by the load deflection means provides force per unit of deflection which increases substantially linearly up to a maximum amount of deflection where the wave springs are fully compressed. The characteristics of this particular type of load deflection means are desirable to maintain proper engagement of the hypoid gears and maintaining substantially consistent bearing preload over an extended period of time. Other types of load deflection means which can be used as mentioned previously should have similar characteristics.

In addition to providing a substantially constant preload on the differential bearings, the invention enables assembly of the differential case 18 into the carrier 10 in a simplified manner. The arrangement does not require spreading of the carrier 10. Spreading of the carrier housing is normally accomplished by means of spreader holes formed in the housing by additional machining procedures. Spreading of the carrier housing also requires the use of special tools, and may result in undesirable deformation of the carrier housing, thereby effecting tolerances and subsequent operation. In assembly, the load deflection member 42 and spacer means 45 (if used) are assembled into the differential bearing seat opposite the differential ring gear flange 46 as previously described. To assemble the differential into the axle housing, the required backlash for the particular differential gear set may be determined by conventional measurements. For a spacer means 44 corresponding to a selected thickness spacer, the required thickness of this spacer is thus determined by these measurements. Alternatively, if the spacer means is provided as threaded adjuster or similar device, assembly of the differential case 18 in carrier 10 is initially set so that the hypoid gears will go out of mesh as much as possible. With particular spacer means 44 selected, the differential case 18 may be inserted into the axle housing in engagement with the differential bearing assembly 26 opposite the differential ring gear flange. The load deflection means 42 is compressed by forcing the differential assembly against bearing assembly 26 until the hypoid gears of the differential have essentially zero backlash. The previously selected outboard spacer 44 is then installed in association with the ring gear differential bearing assembly 24. Upon relaxation of the load used to compress the load deflection member, proper backlash will be set along with a desired bearing preload. Thereafter, the differential bearing caps 28 may be installed to finish assembly. Alternatively, if a threaded adjuster or similar device is utilized, backlash may be set in the conventional manner against the force of the load deflection member 42, and once set, the differential bearing caps 28 may be installed.

Although preferred embodiments have been shown and described herein, various modifications or alternative embodiments, not specifically mentioned herein, are contemplated and would be recognized by those skilled in the art. Therefore, the invention is only to be limited by the scope of the invention as defined in the appended claims.

What is claimed is:

1. A vehicle axle differential comprising,
   a differential housing having a differential case rotatably mounted within said housing, said differential housing supporting axially spaced differential case anti-friction bearing assemblies which rotatably support and center said case within said housing;
   each of said bearing assemblies being mounted in a differential bearing seat formed in said housing, with one of said bearing seats housing at least a load deflection member acting on said bearing assembly to apply a predetermined force to preload said bearing assembly, said load deflection member maintaining said preload substantially constant upon wear of drive gears associated with said differential wherein the other of said bearing seats houses spacer means, which in conjunction with said load deflection member sets backlash between a drive pinion and a ring gear of the drive gear assembly.

2. A vehicle axle differential comprising, a differential housing having a differential case rotatably mounted within said housing, said differential housing supporting axially spaced differential case anti-friction bearing assemblies which rotatably support and center said case within said housing;

each of said bearing assemblies being mounted in a differential bearing seat formed in said housing, with one of said bearing seats housing at least a load deflection member acting on said bearing assembly to apply a predetermined force to preload said bearing assembly, said load deflection member maintaining said preload substantially constant upon wear of drive gears associated with said differential wherein said differential case includes a differential ring gear flange rotatable within said housing and being adjacent a first bearing seat, with said one bearing seat housing said load deflection member being on an opposed side of said case from said differential ring gear flange, and the other of said bearing seats housing a spacer means, with said load deflection member and said spacer means together setting backlash between a driving pinion and a ring gear carried on said differential ring gear flange.

3. A vehicle axle differential comprising, a differential housing having a differential case including a ring gear flange, which is rotatably mounted within said housing, said differential housing supporting first and second axially spaced differential case anti-friction bearing assemblies which rotatably support and center said case within said housing;

each of said first and second bearing assemblies being mounted in differential bearing seats formed in said housing on opposed sides of said case with said first bearing assembly being mounted in a bearing seat adjacent to said ring gear flange and said second bearing assembly being mounted in the bearing seat on the opposed side of said case, with said second bearing seat housing at least a load deflection member continuously applying a predetermined force on said second bearing assembly to preload said second bearing assembly, said load deflection member maintaining said preload substantially constant upon wear of drive gears in said differential, said substantially constant preload substantially maintaining a predetermined backlash between a power input pinion and a ring gear of said differential over the useful life of said differential.

4. The vehicle axle differential of claim 3, wherein, said load deflection member has a spring force in the range of 95–165 pounds of spring force per inch of ring gear diameter.

5. The vehicle axle differential of claim 4, wherein, said load deflection member has a spring force of 130 pounds per inch of ring gear diameter.

6. The vehicle axle differential of claim 3, wherein, said load deflection member is at least one wave spring.

7. The vehicle axle differential of claim 3, wherein, said load deflection member is at least one coil spring.

8. The vehicle axle differential of claim 3, wherein, said load deflection member is at least one Belleville washer.

* * * * *